US012703118B2

(12) United States Patent
Ebrahimi Afrouzi

(10) Patent No.: US 12,703,118 B2
(45) Date of Patent: *Aug. 11, 2026

(54) ELECTRONIC RAZOR WITH SUCTION

(71) Applicant: Ali Ebrahimi Afrouzi, Henderson, NV (US)

(72) Inventor: Ali Ebrahimi Afrouzi, Henderson, NV (US)

(73) Assignee: Bobsweep USA, Las Vegas, NV (US)

( * ) Notice: Subject to any disclaimer, the term of this patent is extended or adjusted under 35 U.S.C. 154(b) by 218 days.

This patent is subject to a terminal disclaimer.

(21) Appl. No.: 18/466,955

(22) Filed: Sep. 14, 2023

(65) Prior Publication Data

US 2023/0415365 A1 Dec. 28, 2023

Related U.S. Application Data

(63) Continuation of application No. 16/525,104, filed on Jul. 29, 2019, now Pat. No. 11,858,155.

(60) Provisional application No. 62/711,761, filed on Jul. 30, 2018.

(51) Int. Cl.

| | |
|---|---|
| ***B26B 19/38*** | (2006.01) |
| ***B26B 19/02*** | (2006.01) |
| ***B26B 19/20*** | (2006.01) |
| ***B26B 19/44*** | (2006.01) |
| ***B26B 21/38*** | (2006.01) |
| ***B26B 21/40*** | (2006.01) |

(52) U.S. Cl.

CPC ............ *B26B 19/388* (2013.01); *B26B 19/02* (2013.01); *B26B 19/20* (2013.01); *B26B 19/382* (2013.01); *B26B 19/44* (2013.01); *B26B 21/38* (2013.01); *B26B 21/4056* (2013.01); *B26B 19/3886* (2013.01)

(58) Field of Classification Search

None

See application file for complete search history.

(56) References Cited

U.S. PATENT DOCUMENTS

| | | | | |
|---|---|---|---|---|
| 2,716,279 A * | 8/1955 | Peterson | B26B 19/02 | 30/34.2 |
| 5,671,535 A * | 9/1997 | Van Der Borst | B26B 19/28 | 30/43.6 |
| 6,612,034 B2 * | 9/2003 | Damstra | B25F 5/001 | 30/43.6 |
| 8,667,692 B2 * | 3/2014 | Kraus | B26B 19/46 | 30/43.92 |

(Continued)

FOREIGN PATENT DOCUMENTS

| | | | |
|---|---|---|---|
| EP | 3546153 A1 * | 10/2019 | B26B 19/388 |

*Primary Examiner* — Hwei-Siu C Payer

(57) ABSTRACT

Provided is an electronic razor, including: a frame; one or more razor blades detachable from the frame; a razor blade motor to drive the one or more razor blades; one or more sensors; a processor; and a suctioning mechanism positioned below the one or more razor blades, including: a suction fan; a suction fan motor to drive the suction fan; and a hair collection compartment; wherein: the processor learns one or more electronic razor settings based on usage history of the electronic razor. Included is a method for determining one or more electronic razor settings of an electronic razor, including: learning, by a processor of the electronic razor, the one or more electronic razor settings based on a usage history of the electronic razor.

15 Claims, 5 Drawing Sheets

(56) References Cited

U.S. PATENT DOCUMENTS

| | | | | |
|---|---|---|---|---|
| 11,858,155 | B1 * | 1/2024 | Ebrahimi Afrouzi | B26B 19/20 |
| 2009/0277012 | A1 * | 11/2009 | Mikula | B26B 19/44 30/41.6 |
| 2019/0090710 | A1 * | 3/2019 | Marcus | A47L 9/12 |
| 2023/0415365 | A1 * | 12/2023 | Ebrahimi Afrouzi | B26B 21/4056 |

* cited by examiner

ELECTRONIC RAZOR WITH SUCTION

CROSS-REFERENCE TO RELATED APPLICATIONS

This application is a Continuation of U.S. Non-Provisional patent application Ser. No. 16/525,104, filed Jul. 29, 2019, now U.S. Pat. No. 11,858,155, which claims the benefit of U.S. Provisional Patent Application No. 62/711,761, filed Jul. 30, 2018, the entire contents of which are is hereby incorporated by reference.

In this patent, certain U.S. patents, U.S. patent applications, or other materials (e.g., articles) have been incorporated by reference. Specifically, U.S. patent application Ser. No. 15/272,752 (U.S. Pat. No. 10,496,262), Ser. No. 15/949,708 (U.S. Patent Application No. 2018/0232134), Ser. No. 15/048,827 (U.S. Pat. No. 9,661,477), Ser. Nos. 15/981,643, 15/986,670, 16/130,880, and 16/245,998 (U.S. Pat. No. 11,144,056) are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to electronic razors.

BACKGROUND

Electronic razors are a commonly used household item. By simply pushing a button and applying a blade of an electronic razor to an area of the skin, hair may be trimmed or shaved. Electronic razors are convenient as they may be used with or without shaving cream and do not require razor blades to be replaced as often as with conventional razors. Further, electronic razors may include an internal compartment directly beneath the razor blades that may collect hairs as they are trimmed thereby minimizing cleaning for the user. However, inefficiencies remain. While the compartment beneath the razor blades may collect some of the hairs as they are trimmed others remain uncollected thereby requiring some cleaning by the user. Additionally, trimmed hairs may escape while emptying the compartment thereby requiring additional cleaning by the user.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is an electronic razor, including: a frame; one or more razor blades detachable from the frame; a razor blade motor to drive the one or more razor blades; one or more sensors; a processor; and a suctioning mechanism positioned below the one or more razor blades, including: a suction fan; a suction fan motor to drive the suction fan; and a hair collection compartment; wherein: the processor learns one or more electronic razor settings based on usage history of the electronic razor; and the one or more electronic razor settings comprises at least one of a suction fan motor speed, a suction fan motor speed for different levels of coarseness of hair, a suction fan motor speed for different lengths of hair, an electronic razor use schedule, and a razor blade replacement schedule.

Included is a method for determining one or more electronic razor settings of an electronic razor, including: learning, by a processor of the electronic razor, the one or more electronic razor settings based on a usage history of the electronic razor; wherein: the one or more electronic razor settings comprises at least one of a suction fan motor speed, a suction fan motor speed for different levels of coarseness of hair, a suction fan motor speed for different lengths of hair, an electronic razor use schedule, and a razor blade replacement schedule.

DETAILED DESCRIPTION OF SOME EMBODIMENTS

Figure 1A:
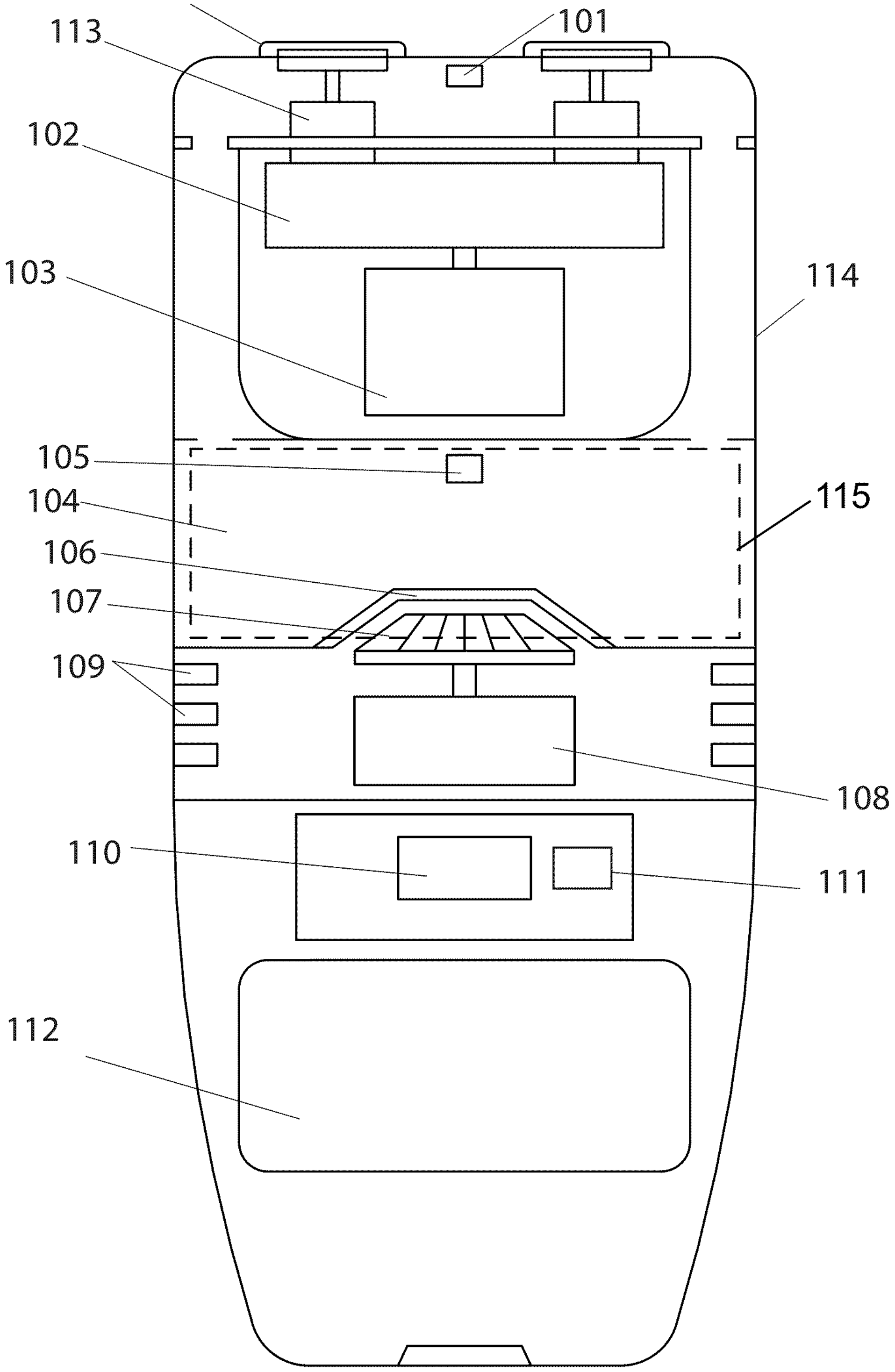
FIGS. 1A-1C illustrate examples of an electronic razor with a hair suction mechanism, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Embodiments of an electronic razor capable of collecting hairs as they are cut during the shaving process is introduced herein. Efficient collection of hairs as they are cut may reduce the post-shaving cleanup required by the user and may provide the user with an easy and clean method for disposing of the collected hairs.

Some embodiments include an electronic razor including one or more razor blades, one or more razor blade motors, a suction fan, a suction fan motor, a rechargeable battery, and a hair collection compartment. In some embodiments, the rechargeable battery operates at least the suction fan motor and the motor for the one or more razor blades. In some embodiments, the electronic razor includes a frame to which components of the electronic razor are coupled. In some embodiments, the electronic razor includes a processor and a memory.

In some embodiments, the suction fan may be used to draw trimmed hairs into the hair collection compartment during the shaving process. In some embodiments, the suction fan may be positioned within the electronic razor beneath the one or more razors blades, wherein the suction fan is positioned such that a front of the suction fan faces towards the one or more razor blades. Various types of suction fans with different fan blades (e.g., shape, angle, size) may be used. In some embodiments, the suction fan motor rotates the suction fan, driving air particles forward, causing the density of air particles and hence air pressure in front of the suction fan to increase. As the pressure in front of the suction fan increases, a vacuum drawing air from the front of the suction fan towards the back of the suction fan is created due to the difference in air pressure across the suction fan. As the pressure drop across the suction fan increases, the volume flow rate of air across the suction fan and suction strength increases as well. In some embodiments, the suction fan positioned within the electronic razor beneath the one or more razor blades generates a vacuum drawing trimmed hard inwards, towards the electronic razor. In some embodiments, the trimmed hard drawn inwards are deposited into the hair collection compartment positioned beneath the suction fan. In some embodiments, the hair collection compartment may be detachable from the electronic razor and may be removed from the suctioning mechanism for emptying. In some embodiments, the hair collection compartment may include a door that may be opened when emptying of the hair collection compartment is required. Various configurations of the electronic razor are possible.

Some embodiments include a suctioning mechanism for electronic razors including a suction fan motor, a suction fan, and a hair collection compartment. In some embodiments, the suctioning mechanism include a rechargeable battery for operating at least the suction fan. Various types of suction fans with different fan blades (e.g., shape, angle, size) may be used. In some embodiments, the suctioning mechanism may be installed within an electronic razor beneath one or more razor blades of the electronic razor, wherein the suctioning mechanism is positioned such that the front of suction fan is faces towards the one or more razor blades. In some embodiments, the suction fan rotates when the one or more razor blades operate, forcing air from the back of the suction fan towards the front of the suction fan, thereby increasing the density of air particles and hence the air pressure in front of the suction fan and decreasing the pressure behind the suction fan. The air pressure drop across the suction fan creates suction that draws air and trimmed hairs inwards towards the back of the suction fan and into the hair collection compartment positioned beneath the suction fan. In some embodiments, the hair collection compartment may be detachable from the suctioning mechanism and may be removed from the suctioning mechanism for emptying. In some embodiments, the hair collection compartment may include a door that may be opened when emptying of the hair collection compartment is required. Various configurations of the suctioning mechanism for electronic razors are possible. In some embodiments, the suctioning mechanism further includes a processor and one or more sensors.

In some embodiments, the electronic razor, the suction fan of the electronic razor, and/or the suctioning mechanism may automatically activate when the one or more razor blades of the electronic razor makes contact with skin, thereby maximizing battery efficiency. In some embodiments, the electronic razor and/or the suctioning mechanism may further include one or more sensors for detecting contact between the one or more razor blades and skin. In some embodiments, the one or more sensors may be coupled to a processor that processes the sensor data and determines when there is contact between the one or more razor blades and skin. In some embodiments, the suction fan of the electronic razor and/or the suctioning mechanism may operate when the electronic razor operates. In some embodiments, the electronic razor, the suction fan of the electronic razor, and/or the suctioning mechanism may automatically activate when motion of the electronic razor is detected or contact between the hand of the user and the frame of the electronic razor is detected. In some embodiments, the electronic razor and/or the suctioning mechanism may further include one or more sensors for detecting motion of the electronic razor (e.g., when a user picks up the electronic razor for shaving) or contact between the hand of the user and the frame of the electronic razor. In some embodiments, the one or more sensors may be coupled to a processor that processes the sensor data and determines when there is motion or contact between the hand of the user and the frame of the electronic razor.

In some embodiments, the electronic razor and/or the suctioning mechanism may further include one or more sensors for detecting one or more fill levels (e.g., empty, low, high, full) of the hair collection compartment. In some embodiments, the one or more sensors may be coupled to a processor that processes the sensor data and determines the fill level of the hair collection compartment. In some embodiments, the processor activates a light on the electronic razor and/or the suctioning mechanism when the hair collection compartment requires emptying. In other embodiments, other methods of notifying a user that the hair collection compartment requires emptying may be used (e.g., a sound, displaying a message on a graphical user interface of the electronic razor, etc.). In some embodiments, the one or more sensors includes an IR transmitter and receiver positioned near the top and on opposite sides of the hair collection compartment such that the transmitter is directly in the light of sight of the receiver. The processor may detect that the hair collection compartment is full when the receiver does not receive the IR signal from the transmitter for a predetermined amount of time as the hair blocks the IR receiver from receiving the signal. In some embodiments, additional IR transmitter and receiver pairs may be positioned at different heights along the length of the hair collection compartment such that multiple fill levels may be detected.

In some embodiments, the electronic razor may include various different types of one or more razor blades. For example, the electronic razor may include carbon, stainless steel, or titanium (e.g., for longer lasting razor blades) razor blades. In some embodiments, the speed of the one or more razor blades may be adjusted. In some embodiments, the electronic razor and/or the suctioning mechanism may further include one or more sensors for detecting a length or coarseness of hair. In some embodiments, a processor processes the sensor data and determines the length or coarseness of hair and autonomously adjusts the speed of the one or more razor blades based on the length or coarseness of the hair being trimmed or shaved (e.g., increasing the speed for longer or coarser hair). In some embodiments, the sensor measures electric current provided to the one or more razor blade motors and the processor may estimate the length or coarseness of hair based on the electric current drawn by the one or more razor blade motors. In some embodiments, a higher electric current may be indicative of longer length of hair or increased coarseness as the one or more razor blade motors requires more power to maintain a particular razor blade speed due to the additional resistance from the longer length of hair or increased coarseness of hair. In some embodiments, the processor adjusts the suction fan motor speed based on the coarseness or length of hair. For example, the processor may increase the suction fan motor speed for longer lengths of hair as more hair falls at once.

In some embodiments, the electronic razor may further include an internal compartment for shaving fluid and a means for automatically dispersing the shaving liquid onto the skin during the shaving process. In some embodiments, a controlled liquid release mechanism may administer the shaving fluid at a predetermined time or at intervals during the shaving process. The internal compartment for shaving liquid may be may be refilled autonomously by the electronic razor or another device (e.g., charging station of the electronic razor) or by the user. In some embodiments, the internal compartment may be loaded with a disposable or refillable pod filled with a fluid (e.g., shaving fluid, aftershave fluid, sanitizing fluid, etc.). In some embodiments, a similar internal compartment may be included for aftershave fluid. In some embodiments, the same internal compartment may be used for shaving fluid and aftershave fluid. For example, a shaving fluid pod may be inserted into an internal compartment. A mechanism may disperse the shaving fluid from the pod onto skin before or during the shaving process. After shaving, an aftershave fluid pod may be inserted into the same or a different internal compartment. The same or a different mechanism may disperse the aftershave from the pod onto the skin. In some embodiments, a user may manually disperse shaving fluid or aftershave fluid onto the skin by manually pressing a button or something of the sort.

In some embodiments, the electronic razor may include a means for sanitizing any cuts that occur during the shaving process. In some embodiments, sensors may detect a cut on the skin during the shaving process and administer a means for sanitizing the cut such as by dispersing a sanitizing cream or the like onto the cut. In some embodiments, the means for sanitizing any cuts may be contained in an internal compartment of the electronic razor that may be refilled autonomously by the electronic razor or another device or by the user. In some embodiments, sanitizing fluid is administered from a disposable or refillable sanitizing fluid pod loaded into the internal compartment. In some embodiments, a user may manually disperse sanitizing fluid onto the skin by manually pressing a button or something of the sort.

In some embodiments, the electronic razor may include a compartment for storing one or more razor blades. In some embodiments, the electronic razor may include a mechanism for autonomously changing the one or more razor blades after a predetermined amount of time or after a predetermined number of uses of the electronic razor. In some embodiments, the electronic razor notifies the user that the one or more razor blades requires replacement after, for example, a predetermined amount of time or a predetermined number of uses of the electronic razor. The electronic razor may notify the user by various means, such as illuminating a light, generating a sound, or displaying a message on a graphical user interface of the electronic razor or an application paired with the processor of the electronic razor. In some embodiments, the application paired with the processor of the electronic razor may be used by the user to order replacement razor blades or may autonomously order replacement razor blades at, for example, predetermined time intervals.

FIG. 1A illustrates an example of an electronic razor including razor blades 100, sensor 101 for detecting contact between razor blades 100 and skin, gear box 102, razor blade motor 103, hair collection compartment 104 including sensor 105 for detecting fill level, filter 106, suction fan 107, suction fan motor 108, air outlets 109, processor 110, memory 111, and battery 112, according to some embodiments. Razor blade motor 103 drives gears of gearbox 102 and subsequently razor blades 100 through connectors 113 that interface with the gears of gearbox 102 on a first end and are coupled to razor blades 100 on a second end. In some embodiments, hair collection compartment 104 may be detachable from frame 114 of the electronic razor or may include a door 115 that is opened to empty the contents.

Figure 1B:
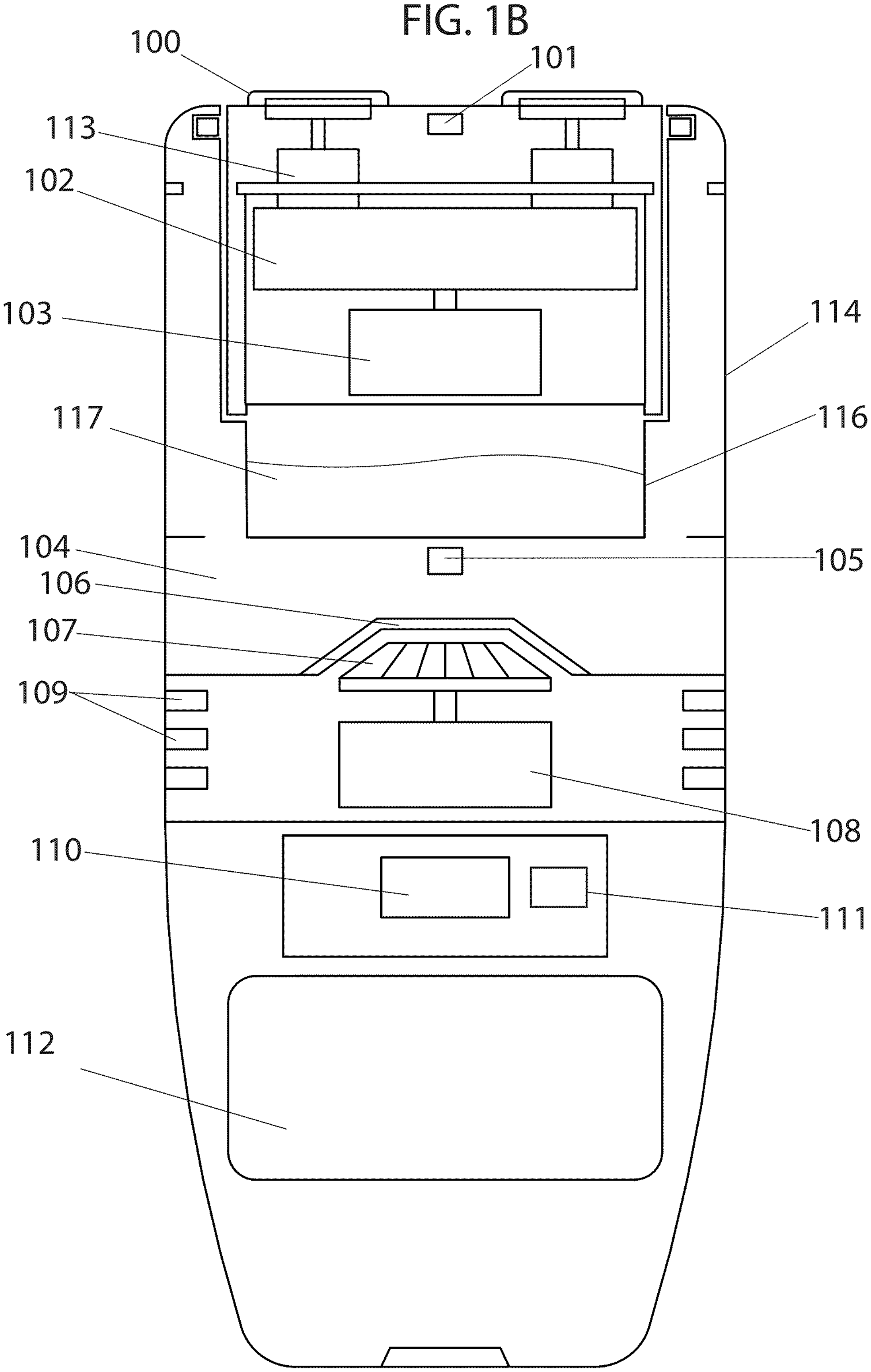

FIG. 1B illustrates another example of an electronic razor including the same components as the electronic razor in FIG. 1A in addition to a fluid compartment 116 for holding shaving fluid 117. A controlled liquid release mechanism may administer the shaving fluid 117 at a predetermined time or at intervals during the shaving process.

Figure 1C:
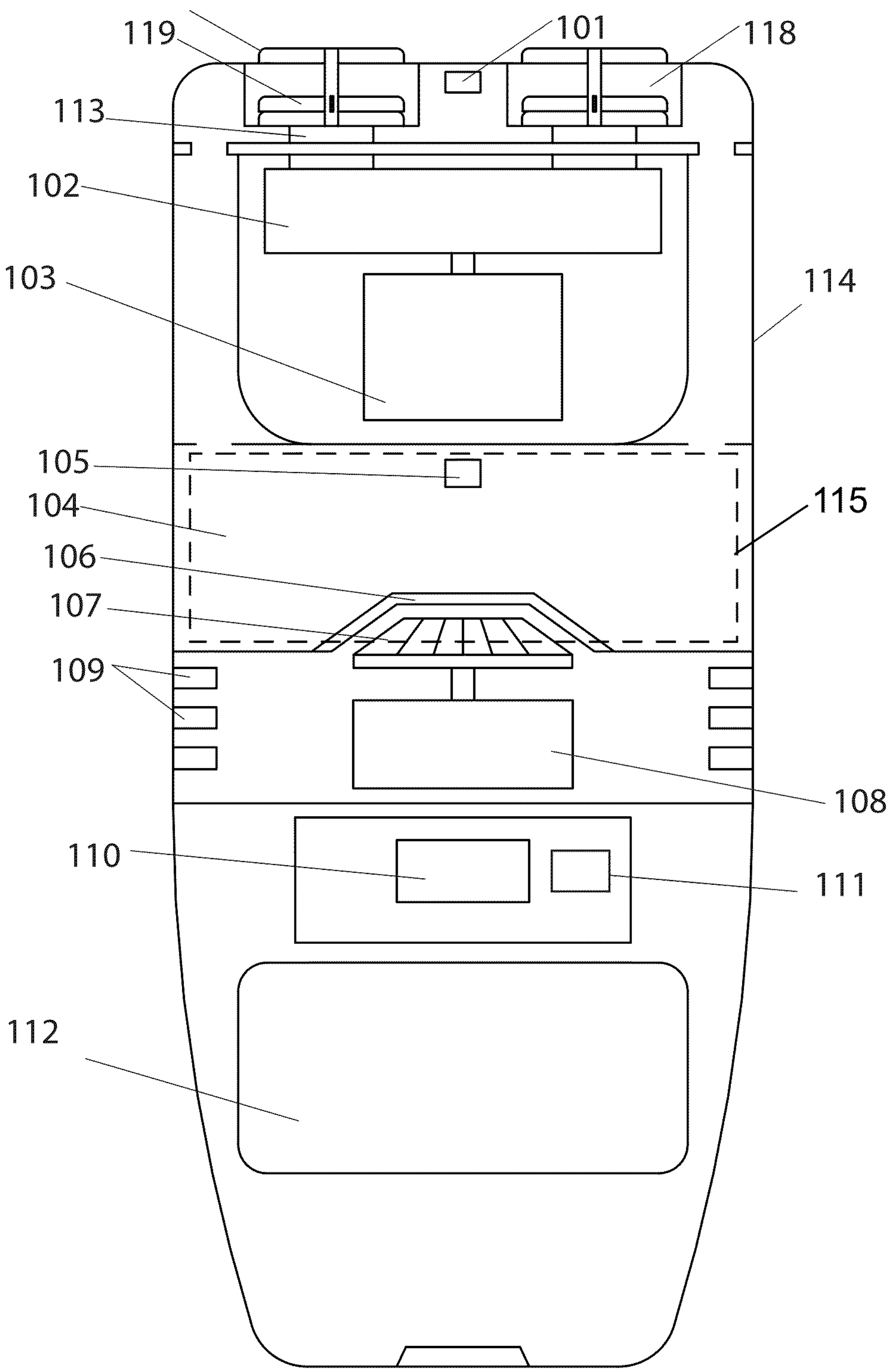

FIG. 1C illustrates another example of an electronic razor including the same components as the electronic razor in FIG. 1A in addition to a compartment 118 for storing new razor blades 119. A mechanism may autonomously change the razor blades 100 with the new razor blades 119 after a predetermined amount of time or after a predetermined number of uses of the electronic razor.

Figure 2:
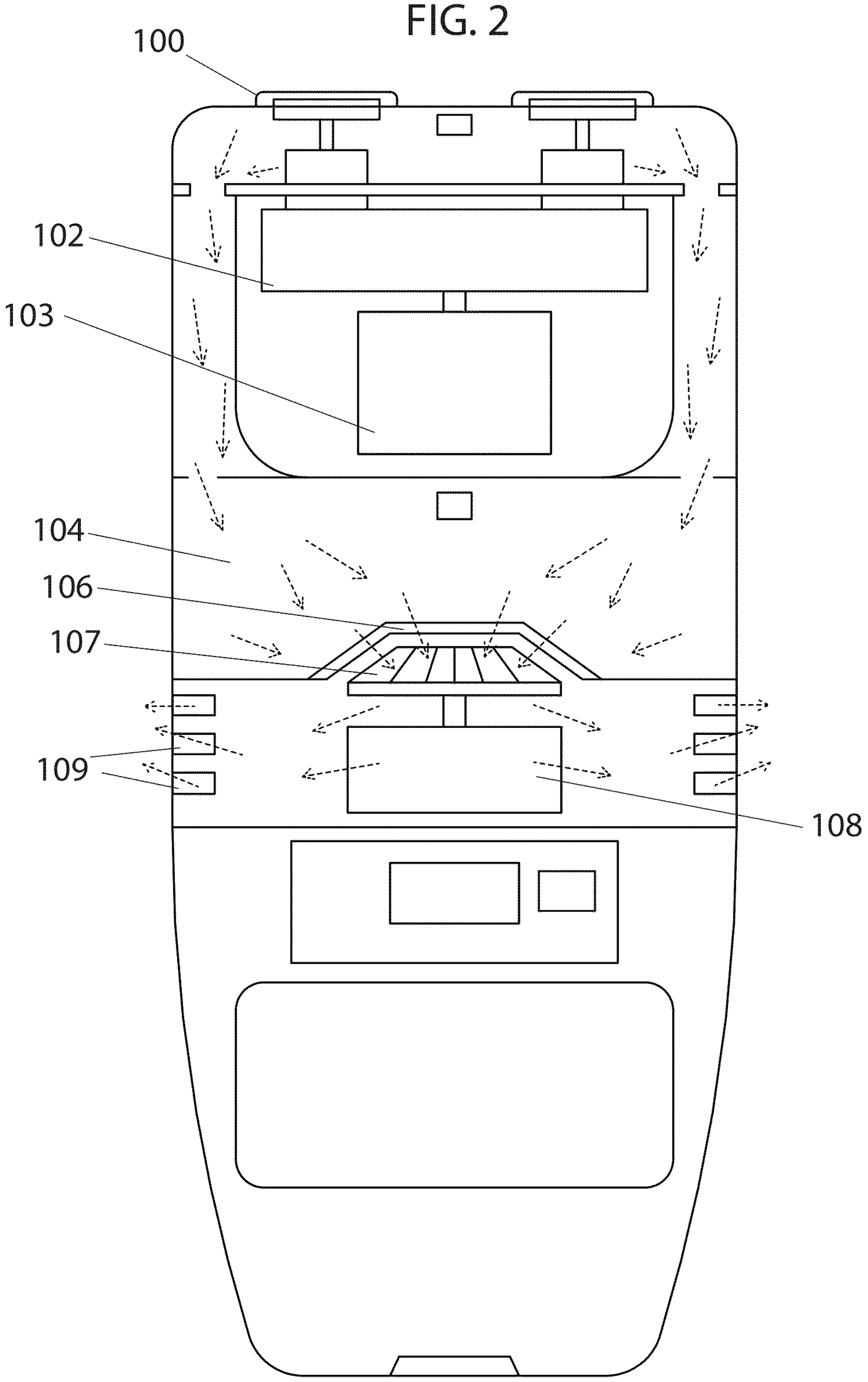
FIG. 2 illustrates an example of a flow path of hair through an electronic razor, according to some embodiments.

FIG. 2 illustrates an example of a flow path of air (indicated by the arrows), according to some embodiments. Suction fan motor 108 drives suction fan 107. Suction fan 107 generates a vacuum that sucks air in through razor blades 100. The air travels past the enclosed gear box 102 and razor blade motor 103 into hair collection compartment 104, through filter 106 and is expelled through air outlets 109. Trimmed hair follows the flow path of air until hair collection compartment 104. The hair remains in hair collection compartment 104 as it cannot flow past filter 106.

Figure 3A:
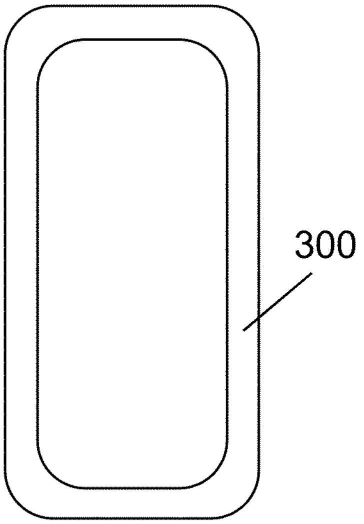
FIGS. 3A-3C illustrate examples of various devices to which a processor of the electronic razor may be wirelessly connected, according to some embodiments.
Figure 3B:
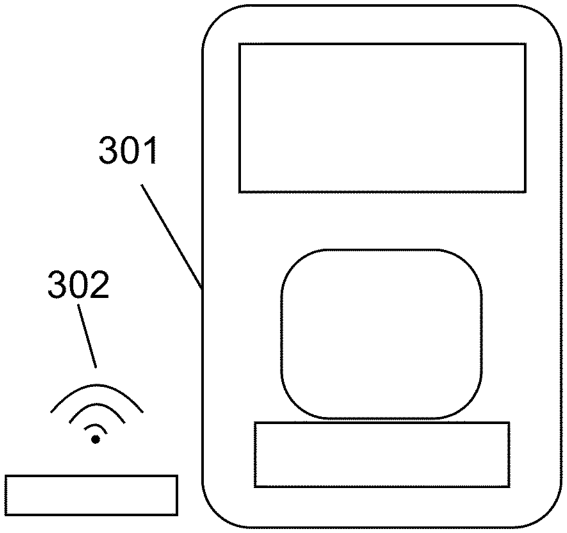
Figure 3C:
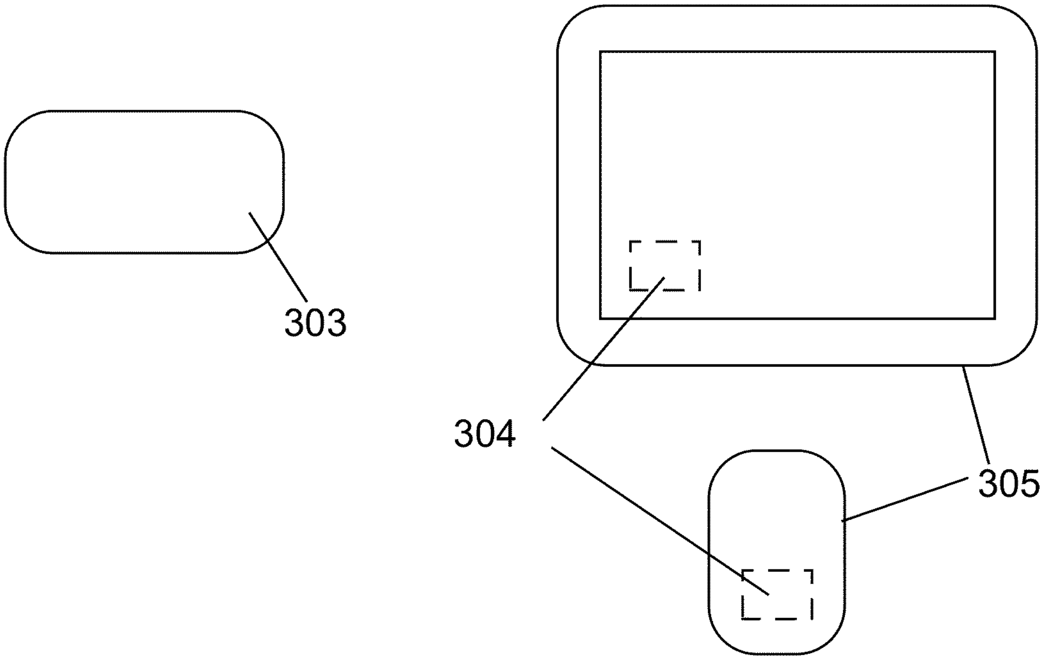

In some embodiments, the processor of the electronic razor may be wirelessly connected with an application of a communication device, as described herein. In some embodiments, the processor of the electronic razor may be wirelessly connected with a processor of another electronic device on a shared network, as described herein. In some embodiments, the processor of the electronic razor may be wirelessly connected with a home control unit, the home control unit wirelessly connected with processors of other electronic devices, as described here. FIG. 3A illustrates an example of a communication device 300. FIG. 3B illustrates and example of another electronic device 301, such us an electronic coffee maker, and a network 302 that may be shared between the electronic device 301 and the electronic razor. FIG. 3C illustrates an example of a home control unit 303 and processors 304 of other electronic devices 305.

In some embodiments, the electronic razor includes a processor that learns over time when to autonomously activate the electronic razor based on use history of the electronic razor. For example, if a user consistently activates the electronic razor Monday morning at 7:00 AM, the processor may learn over time to autonomously activate the electronic razor a couple minutes before 7:00 AM such that is ready for use by the user. In some embodiments, the processor of the electronic razor may learn preferred settings of a user. In some embodiments, the processor may learn preferred settings of the electronic razor associated with coarseness or length of hair (e.g., estimated using a sensor of the electronic razor as described above), day of the week, or another variable. For example, the processor may learn to operate the razor blades at a first particular speed when shaving hair stubble and a second particular speed with shaving a thick beard. In some embodiments, electronic razor settings may include a razor blade motor speed, a razor blade motor speed for different coarseness of hair, a razor blade motor speed for different lengths of hair, a suction motor speed, a suction motor speed for different coarseness of hair, a suction motor speed for different lengths of hair, an electronic razor use schedule, and a razor blade replacement schedule. In some embodiments, the user may provide preferred settings to the processor of the electronic razor using a graphical or other type of user interface of the electronic razor or an application of a communication device (e.g., mobile phone, smart watch, tablet, laptop, specialized computer, remote control, etc.) wirelessly connected with the processor of the electronic razor. An example of a graphical user interface of an application of a communication device that may be paired with a processor of an electronic device is described in U.S. patent application Ser. No. 15/272,752 (U.S. Pat. No. 10,496,262) and Ser. No. 15/949,708 (U.S. Patent Application No. 2018/0232134), the entire contents of which is hereby incorporated by reference.

In some embodiments, the processor of the electronic razor may be wirelessly connected with at least one other processor of an electronic device. In some embodiments, the two or more connected processors of different electronic devices collaborate by sharing intelligence. For example, the processor of the electronic razor may be connected with a processor of an electronic alarm clock. The processor of the electronic alarm clock may collaborate with the processor of the electronic razor by sharing alarm settings and status with the processor of the electronic razor such that the processor may autonomously activate the electronic razor at a time when the user rises from sleep. In another example, the processor of the electronic razor may be connected with a processor of an electronic shower and may share its status with the processor of the electronic shower such that the processor of the electronic shower may prepare a shower for the user during the shaving process of the user, the shower being ready for the user immediately after shaving. In yet another example, the processor of the electronic razor may be connected with a processor of an electronic coffee maker and may share its status with the processor of the electronic coffee maker such that the electronic coffee maker may brew coffee during the shaving process of the user, the coffee being ready by the time the user enters the kitchen. Examples of collaborative methods for electronic devices are described in U.S. patent application Ser. Nos. 15/981,643, 15/986,670, and 15/048,827 (U.S. Pat. No. 9,661,477), the entire contents of which are hereby incorporated by reference.

In some embodiments, the processor of the electronic razor may be wirelessly connected with a home control unit. In some embodiments, a processor of one or more other electronic devices may be connected with the home control unit. In some embodiments, processors of electronic devices share their intelligence with the home control unit. In some embodiments, the home control unit provides instructions to the processors of electronic devices based on at least a portion of intelligence shared with the home control unit. For example, the processor of the electronic razor may share its status with the home control unit. Given an active status of the electronic razor, the home control unit may instruct a processor of an electronic shower to prepare a shower for the user or may instruct a processor of an electronic coffee maker to brew coffee for the user. In some instances, the home control unit may ask the user for a confirmation prior to providing an instruction to an electronic device. Examples of a control system for managing one or more autonomous electronic devices are described in U.S. patent application Ser. Nos. 16/130,880 and 16/245,998 (U.S. Pat. No. 11,144,056), the entire contents of which are hereby incorporated by reference.

In some embodiments, the electronic razor further includes a charging station for recharging its rechargeable battery.

In figures, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A method for determining one or more electronic razor settings of an electronic razor, comprising:

- determining, by a processor of one or more electronic razors, one or more fill levels of a hair collection compartment of the one or more electronic razors based on data from at least one sensor of the one or more electronic razors; and
- learning, by the processor of the one or more electronic razors, the one or more electronic razor settings based on a usage history of the one or more electronic razors;
- wherein:
  - the one or more electronic razors comprise:
    - a pair of a first IR transmitter and a first IR receiver, the first IR transmitter positioned adjacent to a first side of a top portion of the hair collection compartment of the one or more electronic razors and the first IR receiver positioned adjacent to a second side of the top portion of the hair collection compartment of the one or more electronic razors, the second side being directly opposite the first side; and
    - a pair of a second IR transmitter and a second IR receiver, the second IR transmitter positioned adjacent to a first side of a middle portion of the hair collection compartment of the one or more electronic razors and the second IR receiver positioned adjacent to a second side of the middle portion of the hair collection compartment of the one or more electronic razors;
  - the one or more electronic razor settings comprise at least one of a suction fan motor speed, a suction fan motor speed for different levels of coarseness of hair, a suction fan motor speed for different lengths of hair, an electronic razor use schedule, and a razor blade replacement schedule;
- wherein the method further comprises:
  - detecting, by the processor of the one or more electronic razors, the hair collection compartment of the one or more electronic razors is full when the first receiver does not receive an IR signal from the first transmitter for a predetermined amount of time; and detecting, by the processor of the one or more electronic razors, the hair collection compartment of the one or more electronic razors is half full when the second receiver does not receive an IR signal from the second transmitter for a predetermined amount of time.

2. The method of claim 1, wherein:

the at least one sensor of the one or more electronic razors comprises an additional sensor for detecting contact between one or more razor blades and a user; and the method further comprises:

activating, by the processor of the one or more electronic razors, a razor blade motor when contact between the one or more razor blades and the user is detected by the additional sensor.

3. The method of claim 1, wherein:

the at least one sensor of the one or more electronic razors comprises an additional sensor; and the method further comprises:

determining, by the processor of the one or more electronic razors, a coarseness or length of hair of a user based on data from the additional sensor.

4. The method of claim 3, further comprises:

determining, by the processor of the one or more electronic razors, a razor blade motor speed based on the coarseness or the length of hair.

5. The method of claim 3, further comprises:

determining, by the processor of the one or more electronic razors, the suction fan motor speed of the one or more electronic razors based on the coarseness or the length of hair.

6. The method of claim 1, further comprises:

storing, with one or more compartments of the one or more electronic razors, at least one of a shaving fluid, an aftershave fluid, a sanitizing fluid, and at least one new razor blade.

7. The method of claim 1, wherein:

the at least one sensor of the one or more electronic razors comprises an additional sensor for detecting motion of the one or more electronic razors when a user picks up the electronic razor for shaving or when specific movements associated with shaving are performed;

the method further comprises:

automatically activating, by the processor of the one or more electronic razors, a razor blade motor and a suction fan motor of the one or more electronic razors when a motion of the one or more electronic razors is detected.

8. The method of claim 1, further comprises:

receiving, by the processor of the one or more electronic razors, first information from an application of a communication device wirelessly connected to the one or more electronic razors;

sending, by the processor of the one or more electronic razors, second information to the application; and determining, by the processor of the one or more electronic razors, one or more actions of the one or more electronic razors based on at least a portion of at least one of the first information and the second information.

9. An electronic razor, comprising:

a frame;

one or more razor blades detachably mounted to the frame;

a razor blade motor to drive the one or more razor blades;

at least one sensor;

a processor; and a suctioning mechanism positioned below the one or more razor blades, comprising:

a suction fan;

a suction fan motor to drive the suction fan; and a hair collection compartment;

a pair of a first IR transmitter and a first IR receiver, the first IR transmitter positioned adjacent to a first side of a top portion of the hair collection compartment and the first IR receiver positioned adjacent to a second side of the top portion of the hair collection compartment, the second side being directly opposite the first side; and a pair of a second IR transmitter and a second IR receiver, the second IR transmitter positioned adjacent to a first side of a middle portion of the hair collection compartment and the second IR receiver positioned adjacent to a second side of the middle portion of the hair collection compartment;

wherein:

the processor of the electronic razor learns one or more electronic razor settings based on usage history of the electronic razor;

the one or more electronic razor settings comprise at least one of a suction fan motor speed, a suction fan motor speed for different levels of coarseness of hair, a suction fan motor speed for different lengths of hair, an electronic razor use schedule, and a razor blade replacement schedule;

the processor of the electronic razor detects that the hair collection compartment is full when the first receiver does not receive an IR signal from the first transmitter for a predetermined amount of time; and the processor of the electronic razor detects that the hair collection compartment is half full when the second receiver does not receive an IR signal from the second transmitter for a predetermined amount of time.

10. The electronic razor of claim 9, wherein the processor of the electronic razor uses data from the at least one sensor to determine one or more fill levels of the hair collection compartment.

11. The electronic razor of claim 9, wherein the one or more electronic razor settings further comprises at least one of a razor blade motor speed, a razor blade motor speed for different levels of coarseness of hair, and a razor blade motor speed for different lengths of hair.

12. The electronic razor of claim 11, wherein:

the at least one sensor comprises an additional sensor;

the processor of the electronic razor uses data from the additional sensor to determine a coarseness or length of hair of a user; and at least one of:

the razor blade motor speed is determined based on the coarseness or the length of hair determined by the processor; and the suction fan motor speed is determined based on the coarseness or the length of hair determined by the processor.

13. The electronic razor of claim 9, wherein:

the at least one sensor comprises an additional sensor for detecting contact between the one or more razor blades and a user; and the processor of the electronic razor activates the razor blade motor when contact between the one or more razor blades and the user is detected by the additional sensor.

14. The electronic razor of claim 9, wherein:

the at least one sensor comprises an additional sensor for detecting motion of the electronic razor when a user picks up the electronic razor for shaving or when specific movements associated with shaving are performed; and the razor blade motor and the suction fan motor automatically activate when motion of the electronic razor is detected.

15. A system comprising the electronic razor of claim 9 and a communication device, wherein: the processor of the electronic razor is wirelessly connected with an application of the communication device;

the processor of the electronic razor receives first information from the application of the communication device;

the processor of the electronic razor sends second information to the application; and the processor of the electronic razor determines one or more actions of the electronic razor based on at least a portion of at least one of the first information and the second information.

* * * * *